United States Patent [19]

Cederqvist et al.

[11] 4,251,320

[45] Feb. 17, 1981

[54] METHOD OF PRODUCING A MINERAL FIBER PRODUCT

[75] Inventors: Gunnar N. Cederqvist, Lerdala; Ulf L. Aberg, Skövde, both of Sweden

[73] Assignee: Rockwool Aktiebolag, Skövde, Sweden

[21] Appl. No.: 746,130

[22] Filed: Nov. 30, 1976

[30] Foreign Application Priority Data

Jan. 19, 1976 [SE] Sweden .............................. 7600462

[51] Int. Cl.³ .............................................. D21B 1/00
[52] U.S. Cl. ..................................... 162/55; 162/145; 162/152; 162/158; 209/3
[58] Field of Search ................. 162/145, 55, 152, 158; 209/9, 12, 173, 3; 65/9, 10

[56] References Cited

U.S. PATENT DOCUMENTS

| | | | |
|---|---|---|---|
| 3,055,498 | 9/1962 | Megumi | 209/155 |
| 3,300,372 | 1/1967 | Bauer | 162/145 |
| 3,865,315 | 2/1975 | Roberts et al. | 209/3 |

OTHER PUBLICATIONS

Derwent Abstract of Belgian Pat. No. 838373.

*Primary Examiner*—William F. Smith

[57] ABSTRACT

The disclosure relates to the production of a mineral fiber product for example to replace asbestos fibers in different products. In the method of production, at most 7% by weight of mineral fibers is dispersed in water which contains a wetting agent, undispersible material being then separated and the dispersion being then mechanically dewatered to a dry content of from 30 to 70% by weight and a fiber density of from 200 to 400 kg/m³. In a subsequent, separate stage, the fibers are redispersed in water substantially without the addition of wetting agent, are provided with possible additives such as cellulose fibers, are shaped, dewatered and dried.

10 Claims, 1 Drawing Figure

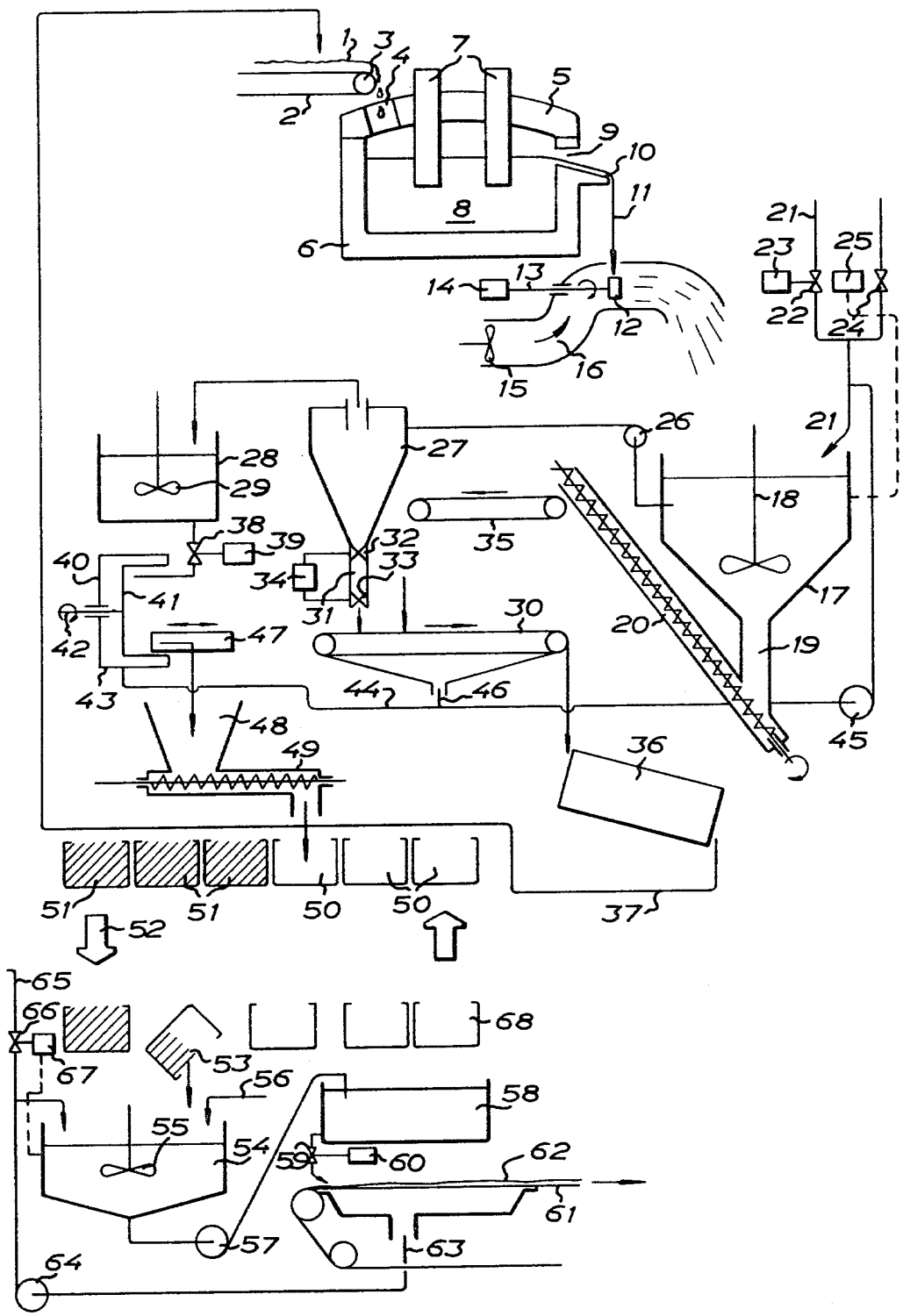

METHOD OF PRODUCING A MINERAL FIBER PRODUCT

The present invention relates to a method of producing a mineral fiber product and more specifically to the production of a web or sheet-like product which consists wholly or partly of such mineral fibers.

In the production of various types of web or sheet-like products it is known in the art to use asbestos fibers for the purposes of utilizing their resistance to heat and chemical attack. One advantage in this respect is the excellent sheet forming properties of the asbestos fibers. Recently however, more and more attention has been paid to the fact that asbestos fibers are unsuitable in many situations because of the health-risks they entail. There is, therefore, a general need in the art, in situations where asbestos fibers have hitherto been made use of, to replace the asbestos fibers with other materials having similar properties. Mineral fibers offer, as such a replacement material, many advantages, primarily as regards chemical inertness and heat resistance. This notwithstanding, mineral fibers display poorer sheet-forming properties is that they do not normally easily disperse uniformly in liquids, such as water, showing instead a tendency to form lumps. Furthermore, mineral fibers often contain considerable amounts of non-fibrous, particulate material in the form of small so-called pearls which have an unfavourable effect on the properties of the finished product, not least its appearance. The particulate material can make up as much as 20-40% of the weight of the mineral fibers.

In view of the above it has not hitherto been possible to utilize mineral fibers as a replacement for asbestos fibers or in other situations which require a fiber material having good sheet-forming properties.

The object of the present invention is to provide a solution to the above-disclosed problem and to provide mineral fibers which are free from particulate material (pearls) and which are uniformly dispersible and have superior sheet-forming properties, whereby it may be possible to produce a mineral fiber product of dispersible mineral fibers. The mineral fibers according to the invention are also suited as additives to other dispersible fibers, for example, cellulose, as reinforcing material, for example, in plaster board for the production of moulded articles, for example, diffusers in ventilation installations etc.

According to the invention, the dispersion and separation of the mineral fibers from the undispersible, particulate material takes place in the presence of a wetting agent, preferably a cation active wetting agent in a dispersion and separation stage. Moreover, the mineral fiber fraction of the dispersion is then mechanically dewatered for obtaining a wetting agent-containing, redispersible fiber fraction which is then conveyed from the dispersion and separation stage to a subsequent re-dispersion stage in which the fibers, substantially in the absence of further wetting agent are redispersed in water, possibly together with further additives, whereafter the shaping, dewatering and drying of the obtained dispersion are carried out.

The jumping-off point of the present invention is mineral fibers which have been produced in the conventional manner.

The obtained mineral fibers are first subjected to a dispersion and separation stage for producing mineral fibers which are free from particulate material and are capable of being dispersed uniformly in water. The dispersion stage is carried out such that the mineral fibers are mixed and dispersed in water to which a wetting agent has been added. The amount of admixed mineral fibers is adjusted in this instance so as to obtain a dispersion with a mineral fiber content of at most 7% by weight, preferably at most 4% by weight, calculated on the amount of liquid. Contents in excess of 7% by weight have proved to give unsatisfactory dispersion results. In order to achieve optimum dispersion, use is made of wetting agent additive in the liquid of 0.001–5.0% by weight, preferably 0.01–3.0% by weight, calculated on the weight of the mineral fibers. The dispersion is suitably carried out at a temperature of from 20° to 40° C., normal ambient or room temperature being preferred. The dispersion can be effected at varying pH levels of the dispersion agent, the pH levels within the alkalic range being preferred and a pH level of about 9 having proved to be particularly favourable. Of the various types of wetting agents which are available, that is to say, anionic active, cationic active and nonionic active wetting agents, the cationic active wetting agents have proved to be particularly suited to the dispersion according to the present invention. Among the particularly preferred cationic active wetting agents, mention can be made of imidazolines, imidazoles, amino oxides, quaternary ammonium compounds etc. of suitable molecular structure.

Under the above-described conditions, a good dispersion of the mineral fibers is obtained, whereas particulate material in the mineral fibers is not dispersed but sinks to the bottom of the treatment vessel, that is to say, a separation of the mineral fibers from the particulate material is obtained at the same time as the fibers are dispersed. In order to separate fully the particulate material from the mineral fibers, the produced dispersion is subjected to dymamic separation, suitably by treatment in a hydrocyclone, a particulate-free mineral fiber fraction being thus obtained.

It should be observed that even if it is, in the present invention, preferred to carry out the dispersion with the wetting agent added to the liquid, it is also possible to add the wetting agent to the mineral fibers by preprocessing them with the wetting agent prior to the dispersion stage.

The mineral fiber fraction of the obtained dispersion is then mechanically dewatered. The mechanical dewatering can be carried out in many different manners, such as dewatering by wire cloth, by rotating drum filter, by centrifuge (which is the preferred method in this case) etc. According to the invention, the dewatering should be pursued to such an extent and be carried out under such conditions that the dewatered fiber fraction have a dry content of from 30 to 70% by weight and a fiber density of from 200 to 400 kg/m$^3$. The dewatering is suitably carried out under the same temperature conditions as in the above dispersion and separation stage, that is to say, at from 20° to 40° C., preferably in the ambient temperature. For economic reasons, it is important that the fiber fraction be not totally dewatered, but that the dewatered product have a water content in the range of from 30 to 70% by weight. The reason for this is that for a total dewatering it would be necessary that the fiber fraction be dried, which would require the consumption of a great amount of energy. Furthermore, total drying would increase the volume of the dewatered fiber product, that is to say, a dewatered fiber product would be obtained with a lower fiber density than is the case in a process limited to mechanical dewatering. This in turn entails increased transport costs, since the same amount of dewatered fiber product would require greater space in the event of total dewatering (drying) as compared with mechanical dewatering. Despite the fact that the drying results in a weight reduction because of the removal of water, it has proved that this weight reduction cannot counteract the increased transport costs occasioned by the volume increase caused by drying. Thus, it is clear that the partial dewatering constitutes, as opposed to total dewatering, an essential feature of the present invention.

The liquid separated in the dewatering process and containing unused excess wetting agent is recycled to the dispersion and separation stage and can there, after the necessary addition of further wetting agent, be used once again for dispersing further amounts of mineral fibers. This recycling avoids the discharge of pollutive, wetting agent-containing liquid, which is an advantage from the point of view of environmental management, at the same time as an improved process economy is achieved.

The dewatered mineral fiber product, which can be considered as an intermediate product, is then subjected, in a subsequent redispersion stage, to renewed dispersion, shaping and dewatering as well as drying for realizing the final mineral fiber product. This treatment is normally carried out on another site, that is to say, the production of the intermediate product is separated from the subsequent treatment both in time and space and the intermediate fiber product is often, therefore, packed in for example, containers for transport to the site where the subsequent processing is to be carried out.

The redispersion treatment is effected in that sufficient liquid, such as water, is added to the dewatered intermediate fiber product in order to obtain a dispersion of the desired concentration. At this point it is important to note that it is not necessary, in the redispersion process, to add any particular wetting agent for dispersing the mineral fibers, since these have, in the earlier dispersion and separation stage and the subsequent mechanical dewatering, obtained a sufficient amount of wetting agent to be redispersible. Thus, it has become hereby possible to eliminate entirely those problems which would have occurred if it had been necessary, in the redispersion process, to add wetting agent, in which case it would have been necessary to add excess wetting agent, with the result that the residual water after the dewatering of the redispersed mineral fibers would have contained wetting agent with ensuing pollution and environmental problems. It can be said that the introductory dispersion and separation stage and the mechanical dewatering provide a redispersible mineral fiber product which has been automatically given the correct dosage of wetting agent in order to be dispersible. Moreover, as a result, the art can be said to have rid itself of problems in the subsequent production of the finished product both as regards process techniques and as regards the environment.

In the redispersion of the mechanically dewatered intermediate fiber product, the product can be provided with certain additives such as binders, or other types of fibers, for example, cellulose fibers, depending upon whether it is intended to produce a finished product which consists solely of mineral fibers or of mineral fibers in combination with other material. This other material may, for example, comprise cellulose fibers or a matrix of inorganic or organic matter, such as cement, plaster or plastics.

The invention will now be described and exemplified, for illustrative but not restrictive purposes, with reference to the accompanying drawing FIGURE.

As seen on the drawing, the mineral fiber raw material 1 is supplied by means of a conveyor belt 2 across a turning roll 3 through a hole 4 in the roof 5 of a furnace 6. The furnace operates electrically by means of two electrodes 7 and the raw material is converted into liquid form in a melt bath 8. From the melt bath, the molten material runs out in the form of a stream 11 via an opening 9 in the furnace wall and over a spout 10 down to a fibering assembly which contains two rapidly rotating steel cylinders 12 driven by journals 13 which in their turn are driven by a motor 14.

A fan 15 forces a current of air through a channel 16 past the fibering assembly, whereupon the fibers are moved to a disintegrator 17 in which is located an agitator 18 rotating at high speed. At the bottom of the disintegrator there is provided a funnel-like shaft 19 which is terminated at the bottom by a screw conveyor 20 in which coarse undispersible material is removed.

Wetting agent is supplied from a storage tank (not shown) via the conduit 21 to the disintegrator 17. The wetting agent is supplied in doses through a valve 22 which is controlled by a regulator unit 23 in dependance upon the amount of fiber which is to be supplied to the disintegrator 17. Any desired ratio between the amount of mineral fiber fed into the disintegrator and the amount of wetting agent applied can be set by adjustment of the regulator unit 23. Water is also supplied to the disintegrator via the valve 24 which is controlled by the regulator unit 25. The regulator unit 25 receives its impulse from a water gauge in the disintegrator 17. The obtained dispersion is moved from the disintegrator 17 by means of a pump 26 to a cyclone 27 whence mineral fibers which are free from particulate impurities are led in dispersion to the storage tank 28. In the storage tank, the dispersion is kept in motion by means of an agitator 29.

Particulate impurities separated in the cyclone 27 are led out onto the screen conveyor 30 via the sluice 31 which is formed by two valves 32 and 33 which are controlled by the regulator unit 34. The material conveyed from the disintegrator 17 by the screw conveyor 20 is also led to the screen conveyor by means of the conveyor belt 35.

When the separated undispersible and particulate components of the mineral fibers have been freed from excess water, they are led to the drum drier 36 and dried. The thus dried material is then led in the manner suggested by arrow 37 back to the conveyor belt 2 to be placed once again in the furnace 6. The mineral fiber dispersion is led from the storage container 28 via a dosage valve 38 which is controlled by a regulator unit 39 to a centrifuge 40 which consists of a centrifuge basket 41 driven by a journal 42 and surrounded by a centrifuge housing 43. Water emanating from the centrifuge housing is led off via the conduit 44 back to the disintegrator 17 by means of the pump 45. The water from the screen belt 30 is also led via the conduit 46 to the pump 45.

The dewatered mineral fiber pulp in the centrifuge is removed by means of a scraper 47 to the silo 48 whence the pulp is fed by means of the screw 49 down into empty packaging units or containers 50. The filled containers 51 are temporarily stored for later transport 52 to a second system at a distance from the above-described system. In this second system, the dewatered fiber pulp 53 is fed into a disintegrator 54 in which is located an agitator 55.

In disintegrator 54, the fiber pulp 53 is dispersed in water with the help of the agitator 55 and further additives 56 such as cellulose fibers are possibly added. The thus formed dispersion of the fiber pulp 53 (and possibly the additives 56) is then removed from the disintegrator 55 and fed by means of a pump 57 to a storage container 58 whence the dispersion is fed onto a wire cloth 61 by means of a valve 59 which is controlled by a regulator unit 60.

On the wire, the fiber pulp together with possible additives is dewatered to form a material web 62, whereas the waste water 63 is recycled via the pump 64 to the disintegrator 54. In order to compensate the material web 62 for the removed water, extra water is added via the conduit 65 across a valve 66 controlled by a regulator unit 67. The empty packaging units 68 can be retransported to the first-described system.

Instead of the above-described system for final shaping of the mineral fiber product, porous moulds can be used in which the fiber pulp is cast to the desired shape.

What we claim and desire to secure by Letters Patent is:

1. A method for producing a dispersible intermediate mineral fiber product derived from silicate containing materials comprising:
    (a) dispersing said fibers in water in the presence of a wetting agent;
    (b) separating particulate material in the mineral fibers from the dispersed fiber material such that the mineral fibers are dispersed in an amount not greater than 7 percent by weight based upon the amount of liquid in the dispersion and separation stage; and
    (c) partially drying said fibers by mechanical dewatering to a dry content of from 30 to 70 percent by weight and a fiber density of from 200 to 400 kg/m$^3$.

2. The method of claim 1 in which the intermediate is redispersed in water without added wetting agent, subsequently shaped dewatered and dried to produce a final product comprised of said mineral fiber material.

3. The method of claim 1, wherein the mineral fibers are dispersed in an amount of not greater than 4% by weight, based upon the amount of liquid in the dispersion and separation stage.

4. The method of claim 1, wherein the wetting agent is added in an amount from 0.001 to 5.0% by weight based upon the weight mineral fibers in the dispersion and separation stage.

5. The method of claim 1, wherein the wetting agent is added in an amount of from 0.01 to 3.0% by weight based upon the weight of the mineral fibers in the dispersion and separation stage.

6. A method of claim 1, wherein the wetting agent is a cationic active wetting agent selected from the group consisting of imidazolines, imidazoles amino oxides, and quaternary ammonium.

7. A method of claim 1, wherein the undispersable particulate matter is separated by means of dynamic separation in the separation stage.

8. The method of claim 1, wherein the mineral fibers are dewatered mechanically by centrifugal action after the dispersion and separation stage.

9. The method of claim 1, wherein the liquid separated in the mechanically dewatering process is recycled to the dispersion and separation stage and, after supplementation with added wetting agents is utilized for dispersing further mineral fibers.

10. A method of claim 2, wherein the dispersible mineral fibers are redispersed together with cellulose fibers.

* * * * *